(12) United States Patent
Sheikholeslami et al.

(10) Patent No.: US 11,833,668 B2
(45) Date of Patent: Dec. 5, 2023

(54) ELECTROMAGNETIC GRIPPING DEVICE

(71) Applicant: NEXERA ROBOTICS CORP., Coquitlam (CA)

(72) Inventors: Sepehr Sheikholeslami, Vancouver (CA); Carlo Menon, Coquitlam (CA)

(73) Assignee: NEXERA ROBOTICS CORP.

( * ) Notice: Subject to any disclaimer, the term of this patent is extended or adjusted under 35 U.S.C. 154(b) by 144 days.

(21) Appl. No.: 17/427,912

(22) PCT Filed: Feb. 4, 2020

(86) PCT No.: PCT/US2020/016463
§ 371 (c)(1),
(2) Date: Aug. 2, 2021

(87) PCT Pub. No.: WO2020/160561
PCT Pub. Date: Aug. 6, 2020

(65) Prior Publication Data
US 2022/0118630 A1    Apr. 21, 2022

Related U.S. Application Data

(60) Provisional application No. 62/799,870, filed on Feb. 1, 2019.

(51) Int. Cl.
*B25J 15/06* (2006.01)
*B25J 9/12* (2006.01)
*B25J 19/00* (2006.01)

(52) U.S. Cl.
CPC ............. *B25J 15/0616* (2013.01); *B25J 9/12* (2013.01); *B25J 15/0683* (2013.01); *B25J 19/0054* (2013.01)

(58) Field of Classification Search
CPC . B25J 9/12; B25J 9/123; B25J 15/0616; B25J 15/0683; B25J 15/0085; B25J 15/0023; B25J 19/0054; B25J 11/0045
USPC ............................. 294/187, 192, 86.4, 99.1
See application file for complete search history.

(56) References Cited

U.S. PATENT DOCUMENTS

| 2,803,761 | A | | 8/1957 | Young |
| 3,245,710 | A | | 4/1966 | Begemann |
| 3,389,355 | A | * | 6/1968 | Schroeder, Jr. ....... H01F 7/1607 335/266 |
| 4,504,088 | A | | 3/1985 | Carter |

(Continued)

FOREIGN PATENT DOCUMENTS

| EP | 1731452 A2 | 12/2006 | |
| SU | 1316817 A1 | 2/1986 | |
| WO | WO-2015006613 A1 * | 1/2015 | .......... B25J 15/0023 |

OTHER PUBLICATIONS

Search report issued by the Intellectual Property Office of the UK in relation to GB Application No. GB1813208.4 dated Dec. 9, 2021, 2 pgs.

*Primary Examiner* — Dean J Kramer

(57) ABSTRACT

The present invention will provide a device in which the gripping action is achieved by a compliant membrane manipulated by electromagnetic forces. The gripping force provided by the present invention is best suited for delicate objects, as it gently applies the gripping force necessary for displacement. This is accomplished through a chamber, a membrane, a plunger attached to the membrane, and a solenoid configured to manipulate the plunger, and thus, the membrane.

19 Claims, 15 Drawing Sheets

(56) References Cited

U.S. PATENT DOCUMENTS

| | | | |
|---|---|---|---|
| 5,263,753 A | 11/1993 | Breu et al. | |
| 5,775,755 A * | 7/1998 | Covert | B25J 15/0226 |
| | | | 294/196 |
| 6,846,029 B1 * | 1/2005 | Ragner | B25B 9/00 |
| | | | 294/219 |
| 7,086,675 B2 | 8/2006 | Jacobs | |
| 7,222,901 B2 | 5/2007 | Gebauer et al. | |
| 7,396,005 B2 | 7/2008 | Berset et al. | |
| 7,967,351 B2 | 6/2011 | Wu | |
| 9,108,319 B2 * | 8/2015 | Kniss | B25B 11/007 |
| 9,133,864 B2 | 9/2015 | Menon et al. | |
| 9,505,955 B1 | 11/2016 | Krahn et al. | |
| 9,623,570 B1 | 4/2017 | Krahn et al. | |
| 10,086,519 B2 * | 10/2018 | Wagner | B25J 15/0023 |
| 10,087,020 B1 | 10/2018 | Ruiz et al. | |
| 10,926,577 B1 * | 2/2021 | DeCamillis | B44B 11/02 |
| 2007/0257757 A1 * | 11/2007 | Kolb | H01F 7/1615 |
| | | | 335/229 |
| 2009/0297316 A1 | 12/2009 | Wells et al. | |
| 2011/0193362 A1 | 8/2011 | Prahlad et al. | |
| 2016/0257857 A1 | 9/2016 | Sitti et al. | |
| 2017/0137673 A1 | 5/2017 | Pesika et al. | |
| 2017/0203443 A1 | 7/2017 | Lessing et al. | |
| 2018/0015618 A1 * | 1/2018 | Nadler | B25J 18/06 |
| 2018/0326579 A1 | 11/2018 | Lessing et al. | |

* cited by examiner

ELECTROMAGNETIC GRIPPING DEVICE

CROSS-REFERENCE TO RELATED APPLICATIONS

This application claims the benefit of U.S. Provisional Patent Application No. 62/799,870, filed on Feb. 1, 2019, and incorporated herein by reference.

STATEMENT REGARDING FEDERALLY SPONSORED RESEARCH AND DEVELOPMENT

Not Applicable.

FIELD OF THE INVENTION

This invention relates generally to an electromagnetic gripping device, and more particularly, to an end effector for robotic manipulators for grasping and moving objects using electromagnetic forces.

DISCUSSION OF RELATED ART

In the world of automated manufacturing there are hundreds of different automated systems performing repetitive jobs. Robotic manipulators and robotic gripping devices are among the most desirable automated tasks where movement of delicate objects is required. Traditionally, robotic gripping devices such as flexible grippers and rigid grippers are developed with different actuation systems, and had their own advantages and disadvantages. With the need to pick different objects comes the need for flexible gripping devices.

Flexible grippers are designed to handle objects in areas where rigid grippers are not best suited. In order to achieve the goal for more flexible grippers, numerous soft grippers have been designed which can pick and place objects with different shapes and weights. Some of these grippers need a vacuum pump or air compressor to actuate. For example, some variants incorporate suction cups and vacuums to lift objects through suction force. Other gripping devices are filled with granular material covered with an elastomer, where the elastomer forms around the object being lifted, and the air inside is evacuated to make it rigid and pick up the object.

While there are different soft grippers in the art, they are limited in many aspects. The need therefore exists for soft grippers to handle delicate objects without compromising speed and reliability. For example, there is the need to pick and place tomatoes in factories to put them one by one in an organized box. Furthermore, there is also a need for self-contained grippers that can pick up relatively heavier objects without the need for costly vacuum system in order to operate while not sacrificing speed of operation. The present invention satisfies these needs.

SUMMARY OF THE INVENTION

The present invention will provide an electromagnetic gripping device adapted to handle delicate objects without compromising speed and reliability. Furthermore, the present invention is self-contained and adapted to pick up relatively heavier objects without the need for additional systems and without increasing operating speed. This is accomplished through a deformable membrane, a plunger attached to the membrane, and a solenoid configured to manipulate plunger, and thus the membrane, about an object. These elements work in conjunction to provide grip onto an object using electromagnetic force, or more specifically, by deforming the membrane such that it provides the grip necessary to lift and displace the object.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Figure 1:
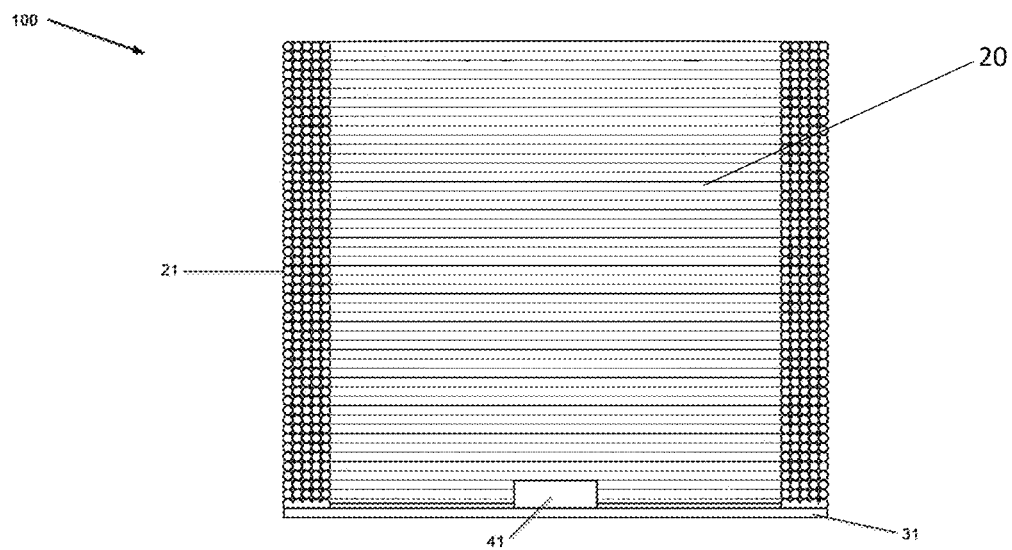
FIG. 1 is a front cross-sectional view of the present invention with a single plunger.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention comprises a chamber 20, a solenoid 21 coiled about the chamber 20, a deformable membrane 31, and a plunger 41 attached to the deformable membrane 31. These components are described in various configurations and work in conjunction to provide grip onto an object 91, or more specifically, by deforming the membrane 31 through electromagnetic forces such that the membrane 31 creates the negative pressure (suction) and/or other forces necessary to lift and displace an object 91. The electromagnetic interaction between the solenoid 21 and the plunger 41 induces movement of the membrane 31, and as such, deformation of the membrane 31 around the object 91. Further movement of the object 91, depending on the roughness and porosity of the object 91, can create a suction pocket between the object 91 and the membrane 31, further increasing the gripping potential of the present invention.

In the preferred embodiment, the chamber 20 comprises a structural support for the device and is generally cylindrical. In the preferred embodiment, the chamber 20 will have at least one open end. Alternatively, the chamber 20 may comprise a closed end, forming a sealed chamber along with the membrane 31. The chamber 20 may be of any suitable shape, such as cylindrical, rectangular, or conoidal. In an alternative embodiment, a plurality of chambers 20 may be connected and work in conjunction to provide the forces necessary to move the plunger 41. The chamber 20 comprises a durable and resilient material, such as aluminum or other metal alloy. Alternatively, the chamber 20 may be made of a durable, resilient, and non-magnetic material. In a further alternative embodiment, a plurality of sensors are incorporated to detect the position of the membrane 31, plunger 41, the object 91, the temperature of the device, the pressure of the device, and other environmental information.

The solenoid 21 is positioned within or around the perimeter of the chamber 20 and comprises conductive wire wrapped around the chamber 20 generally in the shape of a spiraled coil and adapted to generate a magnetic field when current is applied to the solenoid 21. The magnetic field generated by the solenoid 21 is adapted to interact with the plunger 41, which is positioned adjacent to or within the solenoid 21. The strength of the magnetic field varies by application, and as such, the design criteria of the present invention may change depending on the application. More specifically, the strength of the magnetic field is modified by increasing or decreasing the number of wire turns the solenoid 21 is wrapped around the chamber 20, by increasing or decreasing the diameter and length of the wire in the solenoid 21, by increasing the current applied to the solenoid 21, or by changing the material used in the solenoid 21. Furthermore, the direction of the magnetic field can be switched by changing the polarities of power applied to the solenoid 21.

The solenoid 21 is conductive and its conductivity is dependent on the material used. The solenoid 21 may be made of copper, silver, gold, or other suitable conductive material depending on the power, efficiency, and cost needs of the application. Furthermore, the solenoid 21 can be a stretchable and flexible (e.g. conductive polymer). In an alternative embodiment, the present invention may comprise a plurality of solenoids 21 in series, parallel, or other configuration adapted to work in conjunction to create a single magnetic field to interact with the plunger 41. For example, a plurality of solenoids 21 may be stacked, each having an independent set of terminals, that may be powered individually or may be powered in series or in parallel. Furthermore, the plurality of solenoids may have different wire thicknesses, each requiring different current, and may further be wound adjacent to one another to provide a more controlled electromagnetic field. While a generally spiral shape is shown in the figures, the overall shape of the solenoid 21 can be in the form of cylindrical, conical, toroidal, helical or other geometry where the magnetic field can be created to interact with the plunger 41.

The membrane 31 comprises a flexible and durable substrate capable of providing substantial grip and is positioned adjacent to the solenoid 21. The membrane 31 is adapted to come into direct contact with the object 91 and deform around a part of or the within the chamber 20, although the movement of the membrane 31 within the chamber 20 can vary depending on the application. Suitable membrane 31 materials include latex, silicone, polyurethane, and other polymers or flexible materials. The membrane 31 can also be made in forms of circular, rectangular, cylindrical with a closed end, and any other shape depending on the shape of the solenoid 21 and plunger 41. Furthermore, the membrane 21 can have constant or variable thickness. Lastly, the surface of the membrane 31 can be smooth to better comply with smooth objects, or structured for objects with a rougher surface or where the structured surface can dictate how and where the membrane 31 will fold to maximize grasping and suction forces.

The membrane 31 will provide direct gripping force to the object 91 through the pressure acted by the membrane 31 as a result of deformation in proximity of the object 91. The membrane 31 will also apply other gripping forces, comprising friction, suction, dry adhesion, electro-adhesion, magnetic adhesion, negative pressure, or other forms of attractive force provided by the mechanical, chemical, or nuclear properties of the membrane 31 and the object 91. Dry adhesion is based on van der Waals forces created at the surface of the membrane 31. These van der Waals forces, based on electric dipole interactions, can be enhanced by means of electro dry adhesion. As such, electro dry adhesion can increase the preload of the membrane by exerting an electric force toward the object to be lifted. For this purpose, electrodes can be embedded into the membrane 31 and charged accordingly to increase the preload and to reduce the pressure applied on the object by the membrane.

More specifically, the membrane 31 may be specifically designed to provide attractive and/or repellant forces independent of its deformation. Here, the membrane 31 will further comprise a micro-featured surface adapted to provide dry adhesion, and at least one conductive material adapted to provide electrostatic adhesion. A voltage is applied to the conductive material(s), providing an attractive force to self-preload said micro-featured surface, a resistive force to self-peel said micro-featured surface, or alternating said voltage to self-clean said micro-featured surface. The membrane 31 may comprise a conductive polymer, rubber or silicone rubber or a composite polymer, rubber, or silicone rubber material with embedded conductive particles such as carbon black, carbon nanotubes, silver particles, graphene, graphene, graphite, or other conductive materials, and one electrode.

The plunger 41 comprises a magnetic or ferromagnetic material adapted to react to the magnetic field generated by the solenoid 21. The plunger 41 is directly attached to the membrane 31, and as such, when the plunger 41 moves, so does the membrane 31. More specifically, the power of the magnetic force applied to the plunger 41 from the solenoid 21 will cause the membrane 31 to move into a controlled position, and as the power and magnetic force change, so does the position of the plunger 41, which in turn maintains the deformation of the membrane 31 as the object is displaced through the controlled position of the plunger 41. For example, if an object is positioned below the membrane 31, the current sent through the solenoid 21 may decrease or reverse, enabling the membrane 31 to lower and come into direct contact with the object 91, after which the current will increase, raising the membrane 31 and causing friction, suction, and other forces to grip and lift the object 91.

In the preferred embodiment, the plunger 41 is positioned at the center of the membrane 31. Alternatively, the plunger 41 can be positioned elsewhere on the membrane 31 based on the application and it does not necessarily need to be in the center. Although various plunger 41 shapes are provided in the drawings, the plunger 41 can be of any suitable shape such as rectangular, cylindrical, or other shapes so long as it interacts with the magnetic field provided by the solenoid 21. More specifically, the size and shape of the plunger 41, along with the material used in the plunger 41 and its position within the device, directly influence the plunger's 41 interaction with the magnetic field, and as such, the size, shape, position, and material of the plunger are all selected based on the requirements of the application. In an alternative embodiment, a plurality of plungers 41 are attached to the membrane 31. In a further alternative embodiment, the plunger 41 is isolated from the membrane 31. In yet a further alternative embodiment, the plunger 41 is doped or otherwise combined into the membrane 31 such that the membrane 31 is directly manipulated by the solenoid 21 without the plunger 41. In yet a further alternative embodiment, the plunger 41 is hollow and filled with an aggregate magnetic material.

Figure 19:
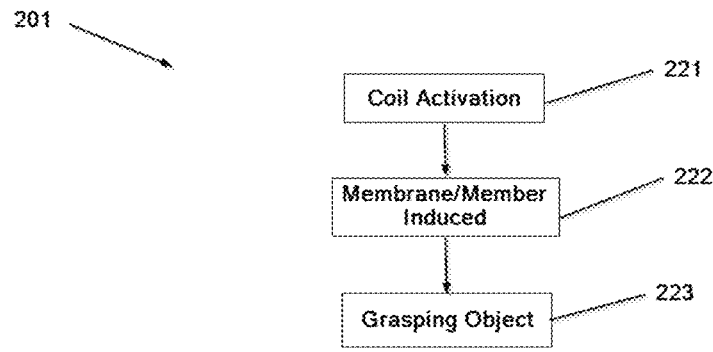
FIG. 19 is a flow diagram showing the steps of the present invention.

FIG. 19 is a flow diagram describing the grasping method 201. First, the solenoid 21 is activated 221. As a result, the plunger 41 and/or a membrane 31 is activated 222 because of the solenoid's 21 magnetic field. Hence, the object 91 is grasped 223.

Figure 20:
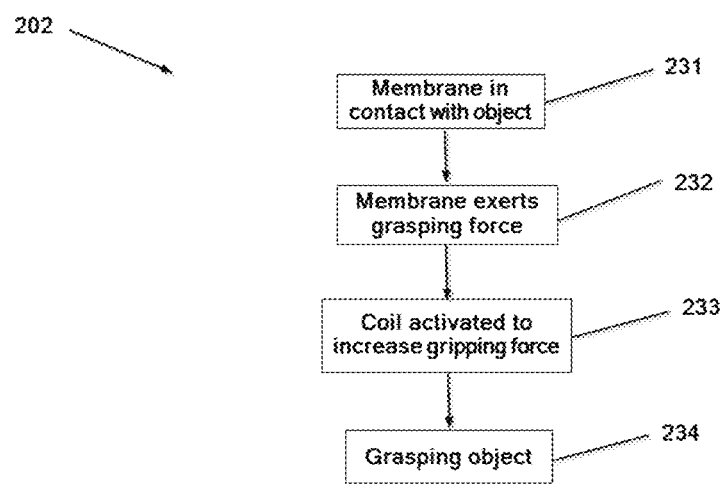
FIG. 20 is a flow diagram showing the steps of the present invention.

In another method 202 as shown in FIG. 20, the membrane 31 is in direct contact with an object 91 in the first step 231. In the second step 232, the membrane's 31 grasping forces, that were explained earlier such as friction or electro-adhesion, provide gripping force to the object 91. Then the solenoid 21 is activated to increase or generate additional grasping forces 233, such as friction and suction. Hence the object 91 is grasped 234.

Figure 21:
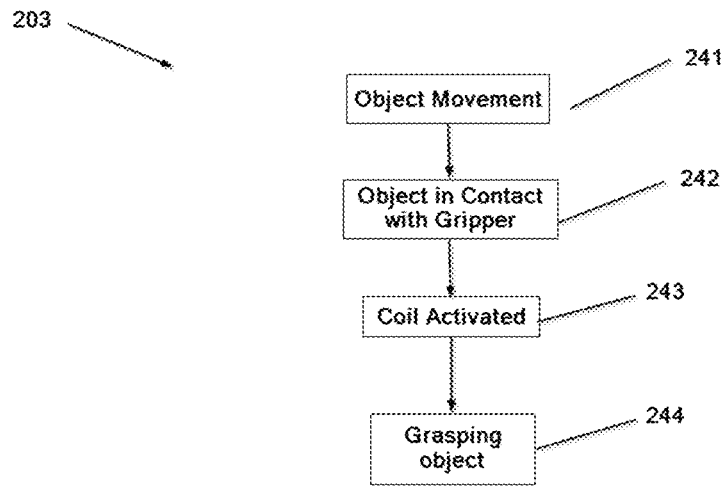
FIG. 21 is a flow diagram showing the steps of the present invention.

The figures illustrate various embodiments that may be used when practicing the present invention. In FIG. 1, a solenoid 21, a plunger 41, and a membrane 31 are used to grasp an object 91. Shown in FIG. 21 is a flow diagram 203 of a method of gripping an object. In the first step 241, the object 91 moves, and then it contacts the gripping device as shown in step 242. The solenoid 21 is then activated 243, and the plunger 41 is moved further away from the object 91 due to the interaction with the solenoid 21. Based on the roughness and porosity of the object, a seal may be created between the object 91 and the membrane 31 through the movement of the plunger 41 by the solenoid 21, creating a suction pocket. Through the suction pocket and/or other forces applied to the object 91 by the gripping device 100, the membrane 31 can grasp 244 the object 91.

Figure 22:
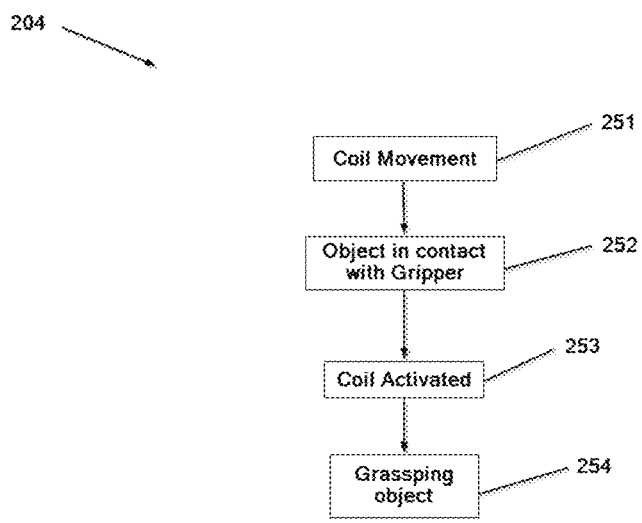
FIG. 22 is a flow diagram showing the steps of the present invention.

In an alternative embodiment as shown in FIG. 22, a flow diagram 204 of a method of gripping an object 91 is shown where the solenoid 21 is moved 251 towards the object 91, and, as in step 252, the gripping device contacts the object 91. Then the solenoid 21 gets activated 253 and the gripping forces by the membrane 31 and/or the suction pocket allows grasping 254 the object 91.

In a further alternative embodiment, the solenoid 21 induces a deformation of the membrane via the plunger 41. In another embodiment, the plunger 41 is positioned in the axis of the solenoid 21.

Figure 18:
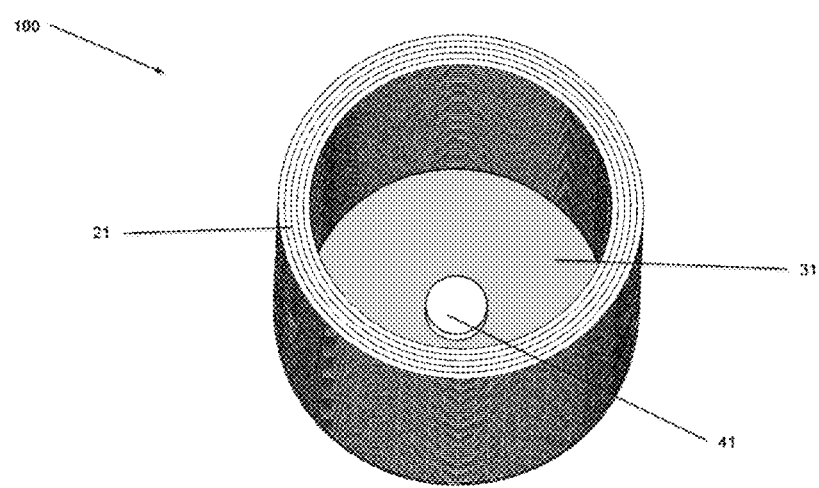
FIG. 18 is a front perspective view of the present invention.
Figure 29:
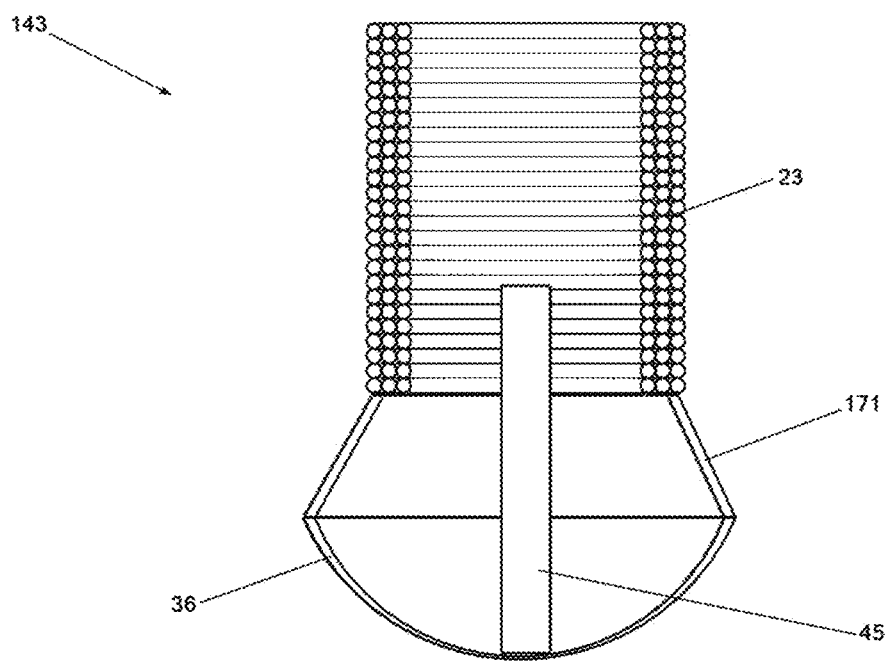
FIG. 29 is a cross-sectional view of the present invention where a connector is shown.

In a further alternative embodiment, as shown in FIGS. 1 and 18, the gripping device 100 comprises a solenoid 21, a membrane 31, and a plunger 41. The plunger 41 is positioned near or in proximity of the center of the membrane 31. The solenoid 21 and the membrane 31 could be connected together via a connector having different shapes and materials. Such a connector could have a protruded or retracted shape. This could be used to facilitate the membrane 31 to conform to the object to be grasped. FIG. 29 shows an example of a gripping device 143, where a connector 171 is attached to the membrane 36. Such a connector 171 could be fixed to the solenoid 23 or the chamber 53 or other parts of the gripper.

In more detail, and still referring to FIGS. 1 and 18, the solenoid 21 can be designed for picking specific objects, hence its size could be designed based on the object being displaced. The solenoid 21 in this instance is in the shape of a cylinder. Depending on the design criteria, the wire can be of different diameters with different number of turns hence defining the solenoid's 21 inner diameter, outer diameter, and length. The membrane 31 is attached adjacent to the solenoid 21 on its edges by means of any bonding material such as epoxy, or the membrane 31 can be cured when it is already in contact with solenoid 21. The membrane 31 shown in FIG. 1 is attached to one end of the solenoid 21, but it does not necessarily need to be connected to the end of the solenoid 21; in other words, it can also be connected in the middle of the solenoid 21, or even positioned between 2 solenoids. The plunger 41 in this embodiment is attached to the membrane 31 using any material that can bond to the membrane 31. The plunger 41 can also be embedded in the membrane 31. The proportionality of the plunger 41 with respect to the solenoid 21 is important and it needs to be chosen depending on size and weight of objects being picked.

Figure 2:
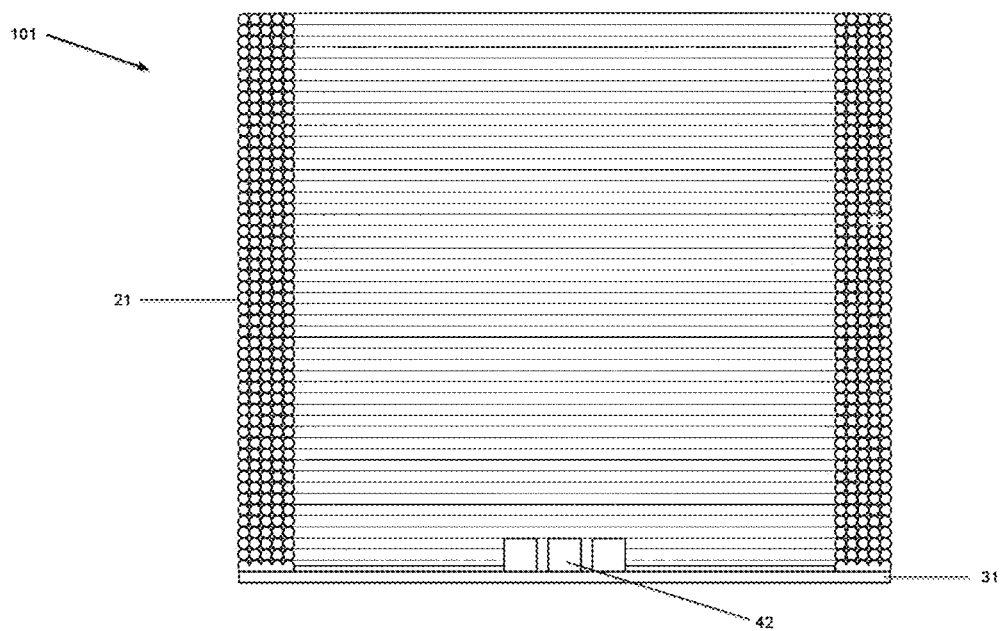
FIG. 2 is a front cross-sectional view of the present invention showing a plurality of plungers.
Figure 28:
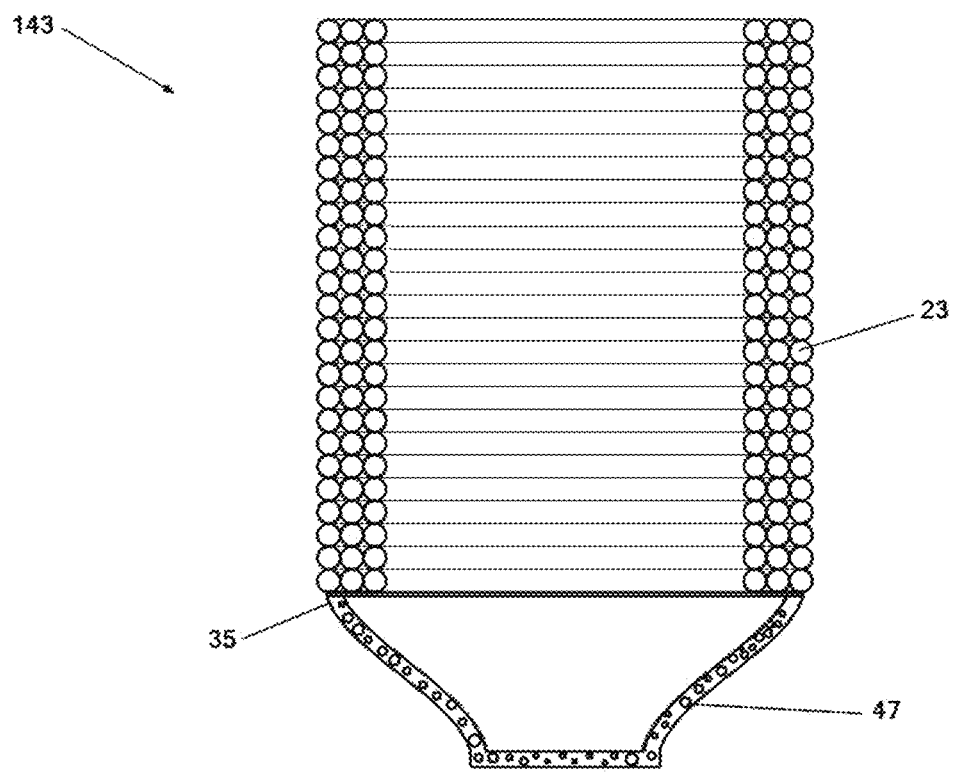
FIG. 28 is a cross-sectional view of the present invention where the plunger is in the form of small-scale particles embedded in the membrane.

Referring now to FIG. 2, there is shown another version of the gripping device 101, where the solenoid 21, the membrane 31, and a plunger 42, which is in the form of small particles attached to the membrane 31. The plunger 42 can be also embedded into the membrane 31. For instance, the membrane 31 could consist of a polymer doped with ferromagnetic or magnetic particles. An illustration is provided in FIG. 28 showing the membrane 35 embedded with particles 47.

Figure 3:
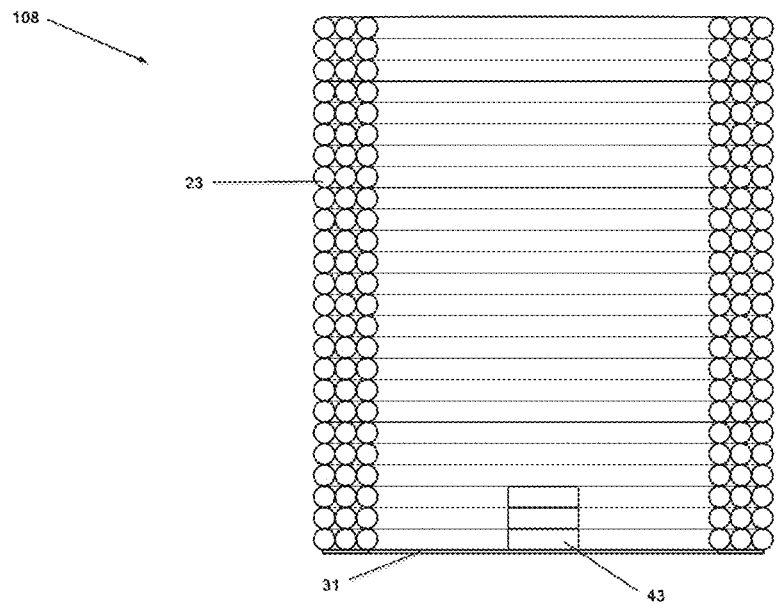
FIG. 3 is a front cross-sectional view of the present invention showing a plurality of stacked plungers.

Referring now to FIG. 3, there is shown another version of the gripping device 108 where the solenoid 23, and the membrane 31 are present with a plunger 43 which is a stack of single plungers. Any number of pieces can be stacked together to form plunger 43, hence change its length as needed. For instance, if the plunger 43 is magnetized then by adding more to the stack, we can increase the final gripping force since the plunger 43 is attracted or repelled by the solenoid 23. Therefore, gripping strength of gripping device 108 can be increased or decreased based on the object it is picking without doing major changes in the design.

Figure 4:
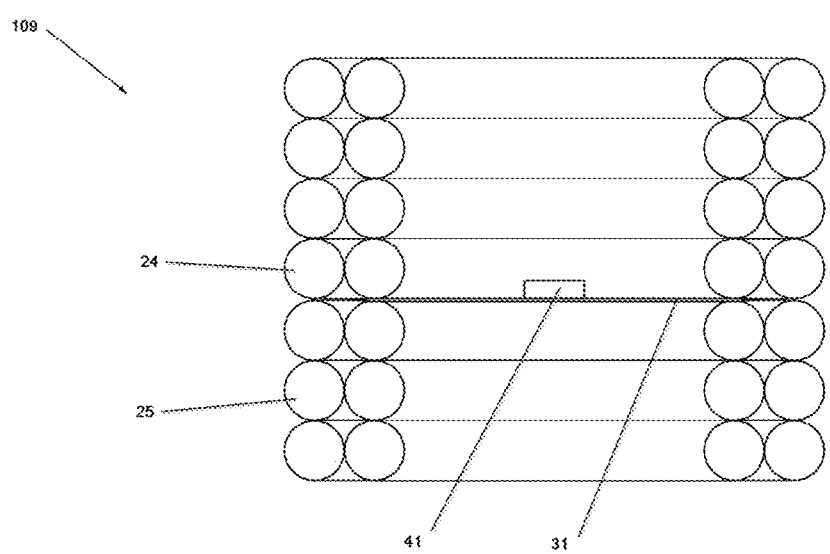
FIG. 4 is a front cross-sectional view of the present invention showing the membrane positioned within the solenoid.

In another embodiment as shown in FIG. 4, the gripping device 109 has a solenoid 24 connected to a solenoid 25 either in series or parallel depending on design requirements. In this embodiment, the membrane 31 is located in between the two solenoids 24 and 25. The location of the membrane 31 helps positioning the plunger 41 to a desired location to better grip the object 91. In general, the size and location of the plunger 41 with respect to the solenoid 21 is an important design factor to reach required gripping strength where it is needed. The magnetic field of the solenoid 24 and 25 interacting with the plunger 41 changes depending on location of the plunger 41 with respect to the overall solenoid 21.

Figure 5:
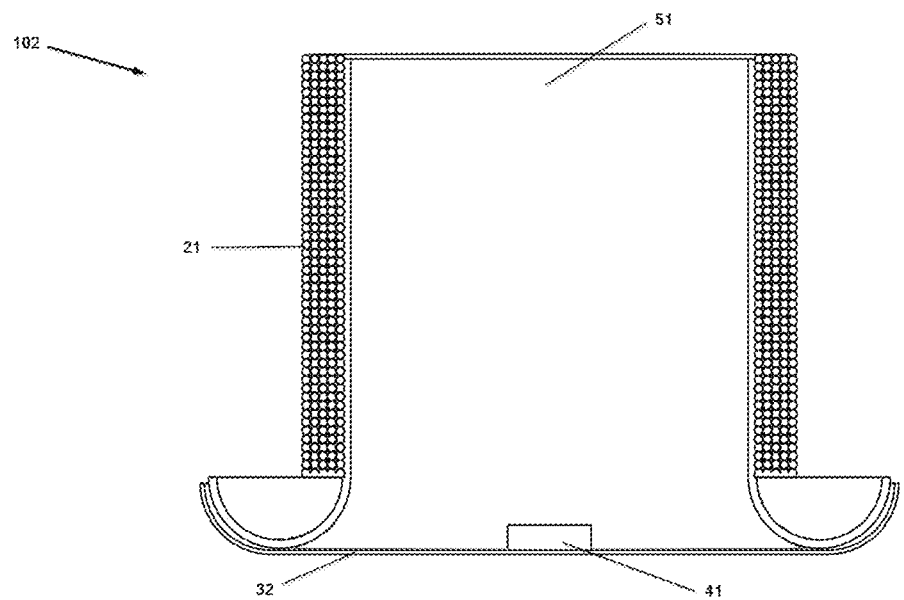
FIG. 5 is a front cross-sectional view of the present invention showing an open-ended chamber.

In another embodiment as shown in FIG. 5, the gripping device 102 has a chamber 20 where the solenoid 21 is wrapped around. This chamber 20 can be of different forms to better help with the gripping process. In one instance, the chamber 51 is in the form of a half toroid attached to a cylinder as shown in FIG. 5. In fact, different shapes of the gripping device can facilitate the gripping of an object by further covering more surface area of the object with a membrane 32, and also helps direct the object to the axis of the solenoid 21. The chamber 51 can also change the position of the plunger 41 with respect to the solenoid 21 by having the extra half toroid on the bottom, hence displacing the membrane 32. For example, it can place the plunger 41 further away from the solenoid 21 to create stronger magnetic fields in gripping positions where more force is needed. In other word, after the object is closer to the solenoid 21, then the plunger 41 is positioned in a stronger magnetic field in the solenoid 21.

Figure 6:
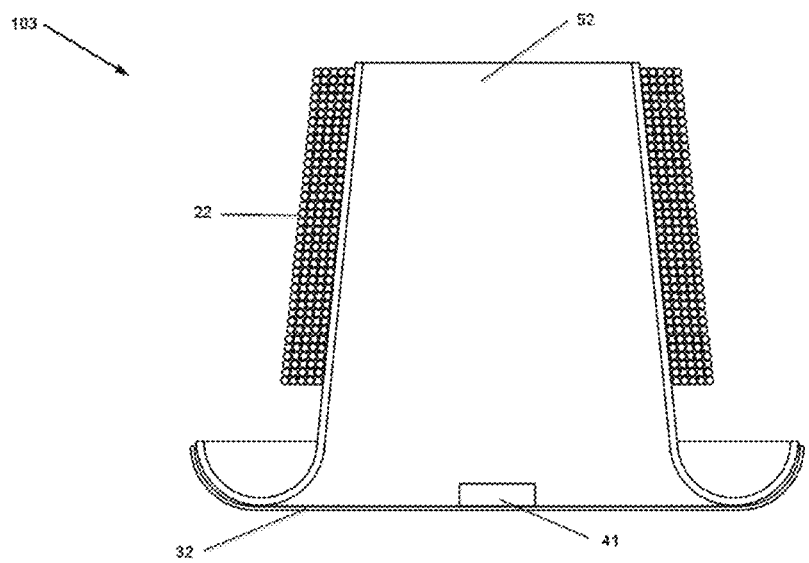
FIG. 6 is a front cross-sectional view of the present invention showing an open-ended chamber with a conoidal-shaped chamber.

In another embodiment as shown in FIG. 6, there is a gripper 103 with a conical shape chamber 52, with a solenoid 22 wrapped around it in the same form. This conical form of the chamber 52 can have different advantages. For instance, it can further increase the griping force by reducing the solenoid's 22 inner diameter as the object is grasped and further moved up the axis of the solenoid 22. Depending on the relative size of the plunger 41 with respect to the solenoid 22, the magnetic force affecting the plunger 41 can be increased since the size of plunger 41, and solenoid 22 are not changing in this embodiment, but the distance from the plunger 41 to the solenoid 22 is reduced as the plunger 41 further moves up the solenoid's 22 axis.

Figure 7:
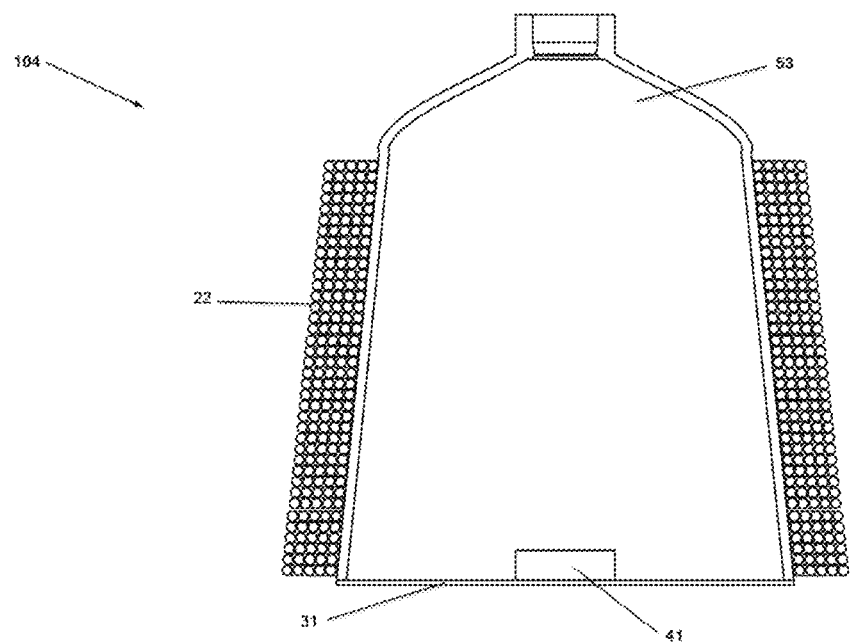
FIG. 7 is a front cross-sectional view of the present invention showing a conoidal-shaped chamber attached to a pressurized line.

In another embodiment as shown in FIG. 7, the gripping device 104 has the solenoid 22 wrapped around a chamber 53 where one end of the chamber 53 is attached to a pressurizes gas or fluid line. In this embodiment the plunger 41 can be pulled up or attracted by the solenoid 21 when gripping an object and the pressurized gas or fluid can push the plunger 41 away to release the grasped object. Therefore, the object can have a tighter and stronger fit in the chamber 53, since the force of the pressurized gas or liquid is strong enough to repel the plunger 41 depending on the application.

Figure 8:
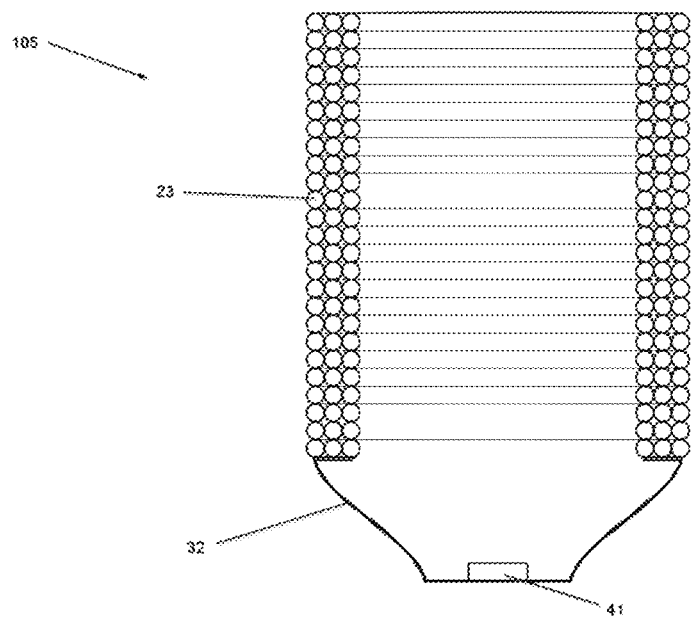
FIG. 8 is a front cross-sectional view of the present invention showing truncated cone.

In another embodiment as shown in FIG. 8, the gripping device 105 has a solenoid 23, a membrane 32, and the plunger 41. In this embodiment a truncated membrane 32 is used. This form of membrane 32 allows more flexibility in picking up the object. For instance, the membrane 32 surface area is bigger in compare to previous embodiments. In other words, the membrane 32 will be less stretched when the object 91 is grasped and moved inside the solenoid 21. Therefore, less holding force is needed to hold the object 91 or less magnetic force is needed to hold the plunger 41 up in the solenoid 21. Most of the magnetic force in this embodiment is used to hold the plunger 41 up in the solenoid 23 and consequently hold the object 91 in grasp position, and ideally zero force is used to compensate the stress caused by the stretch in the membrane 32.

Figure 9:
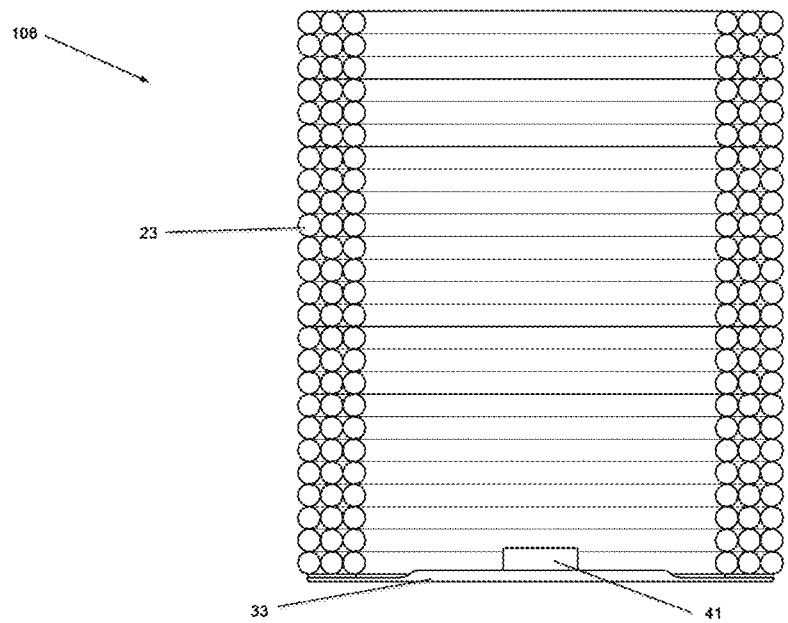
FIG. 9 is a front cross-sectional view of the present invention showing membrane with variable thickness.
Figure 17:
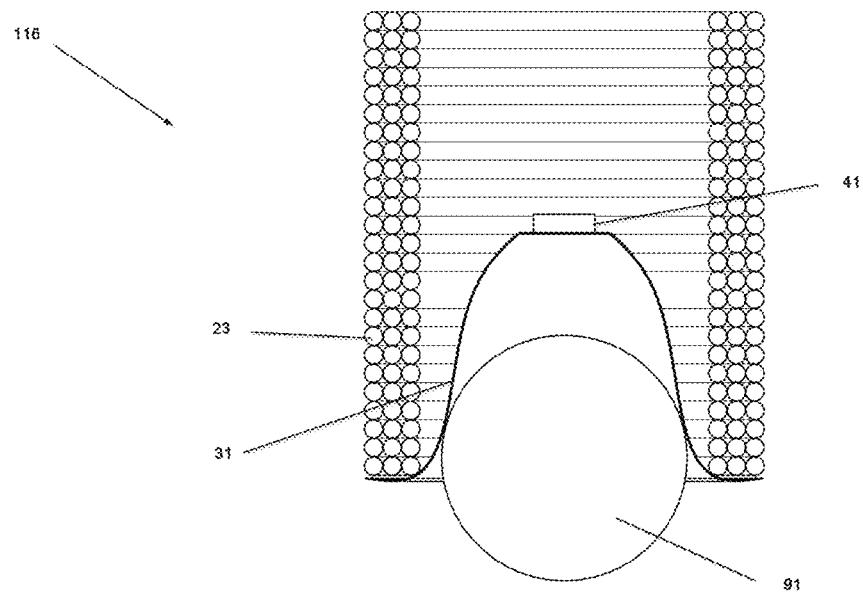
FIG. 17 is a front cross-sectional view of the present invention showing an object being gripped and suction created between the object and the membrane.

In another embodiment as shown in FIG. 9, the gripping device 106 consists of the solenoid 23, a membrane 33, and the plunger 41. In this instance, the membrane 33 has a variable thickness. It is used to better control the stretch ratio in different areas of the membrane 33. In other words, thinner areas will stretch more than thicker parts with the same stress applied to the membrane 33. This idea also helps to have a better suction to grip the object 91 as shown in FIG. 17, which will be explained in more detail in another embodiment.

Figure 10:
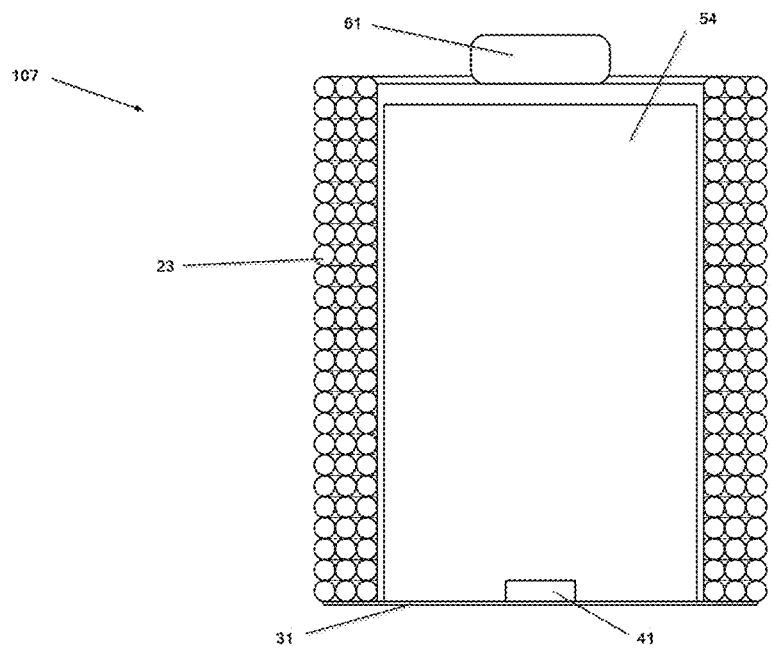
FIG. 10 is a front cross-sectional view of the present invention showing latch.

In another embodiment as shown in FIG. 10, the gripping device 107 consists of the solenoid 23, the membrane 31, the plunger 41, a chamber 54, and a latch 61. In this configuration, the solenoid 23 is wrapped around the chamber 54, and the chamber 54 has a bracket on one end holding the latch 61. This latch 61 can be in the form of any device that can attract the plunger 41. For instance, it can be a solid piece made of ferromagnetic or magnetic material, or it can even be a latching mechanism which can be activated or deactivated to attract the plunger 41. This latch 61 can decrease the power consumption of the gripping device 107. When an object is being grasped by the gripping device 107, the latch can also attract to hold the plunger 41 further up in the solenoid 23, hence reduce the magnetic force needed by the solenoid 23.

In an alternative embodiment, the plunger 41 can be pulled by the solenoid 23 and then the solenoid power is disconnected and the latch 61 holds the plunger 41 while gripping. Then in order to release the plunger 41 and consequently the object 91, the polarity of the solenoid 23 can be reversed to push the object 91 out and release it. In this example the plunger 41 can be magnetic, therefore by reversing the solenoid 23 polarity it can be pushed or pulled in the solenoid 23.

Figure 11:
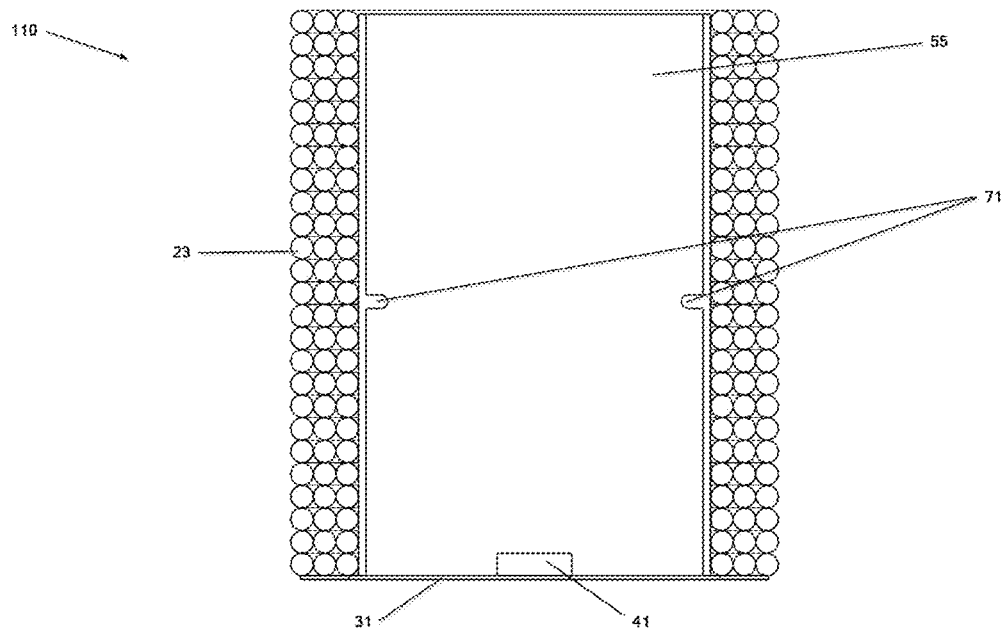
FIG. 11 is a front cross-sectional view of the present invention showing a plurality of sensors.

In another embodiment as shown in FIG. 11, the gripping device 110 has the solenoid 23 wrapped around a chamber 55 which incorporates a set of sensors 71. For instance, these sensors 71 can be used to detect the object 91 being grasped, measure environment attributes such as pressure and temperature, or act as a trigger for another device. These sensors can be based on infrared light or other principles.

Figure 12:
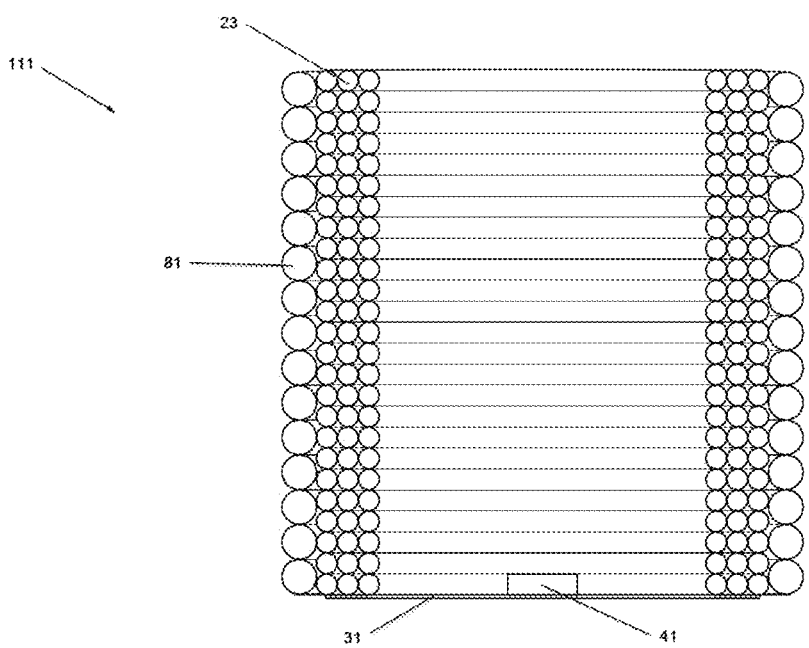
FIG. 12 is a front cross-sectional view of the present invention showing a cooling system adjacent to the solenoid.
Figure 13:
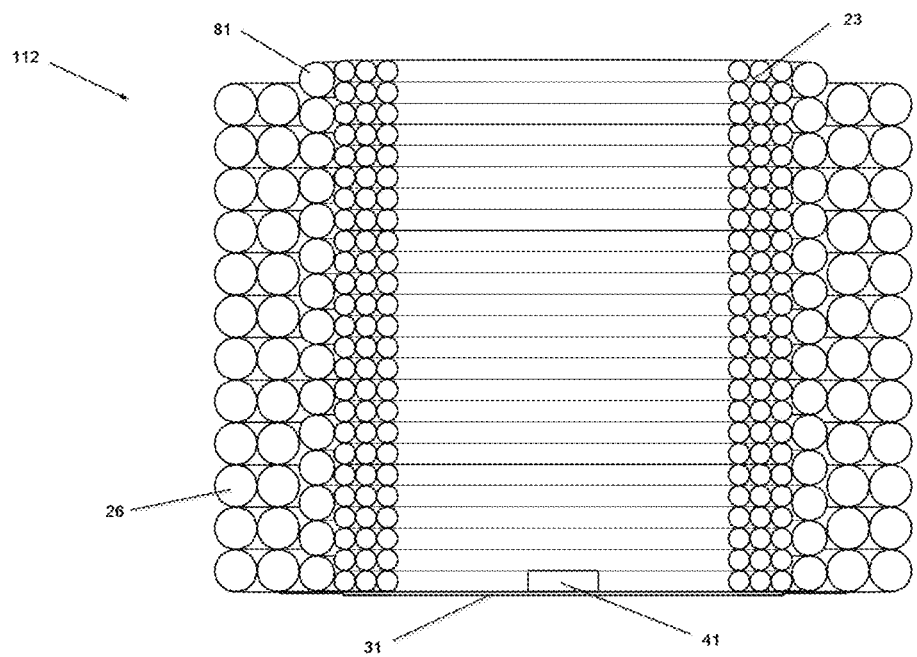
FIG. 13 is a front cross-sectional view of the present invention showing a cooling system positioned between two the solenoids.
Figure 14:
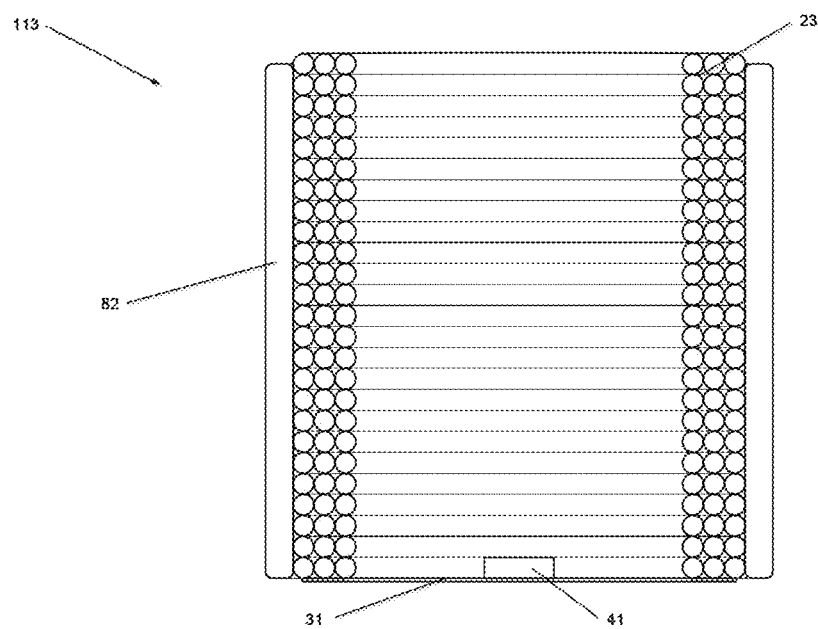
FIG. 14 is a front cross-sectional view of the present invention showing a cooling plate adjacent to the solenoid.

The coiled wire has a resistance and produces magnetic field; hence it can become hot, especially when it is continuously active. Therefore, a cooling device can be used to cool down the solenoid's temperature for better performance and prolonged use. FIGS. 12-14 illustrate embodiments where a cooling device is incorporated into the gripping device to reduce the solenoid temperature. For instance, FIG. 12 shows a gripping device 111 which has a cooling device 81 wrapped around the solenoid 23. The cooling device 81 can be in the form of hollow tubes and pass cooling liquid or gas to take away the increased temperature from the solenoid 23. The cooling device 81 can also be made of a conductive material and also act as a second solenoid and be connected to the solenoid 23 either in series to in parallel.

Now referring to FIG. 13, the gripping device 112 has also another solenoid 26 wrapped around the cooling device 81. In this embodiment, the cooling device 81 not only cools down both solenoid 23 and 26, but also can act as a solenoid itself and be connected in series or parallel with solenoid 23 and 26. In another embodiment as shown in FIG. 14, a gripping device 113 has a cooling device 82 which is a cylinder covering the solenoid 23. In this embodiment the cooling device 82 has a large surface area, and it can dissipate by the means of liquid or air cooling. For instance, for a better air cool, the cooling device 82 can also have fins around it and a fan on top to move cool air in between the fins and remove the heat from the other end.

Figure 15:
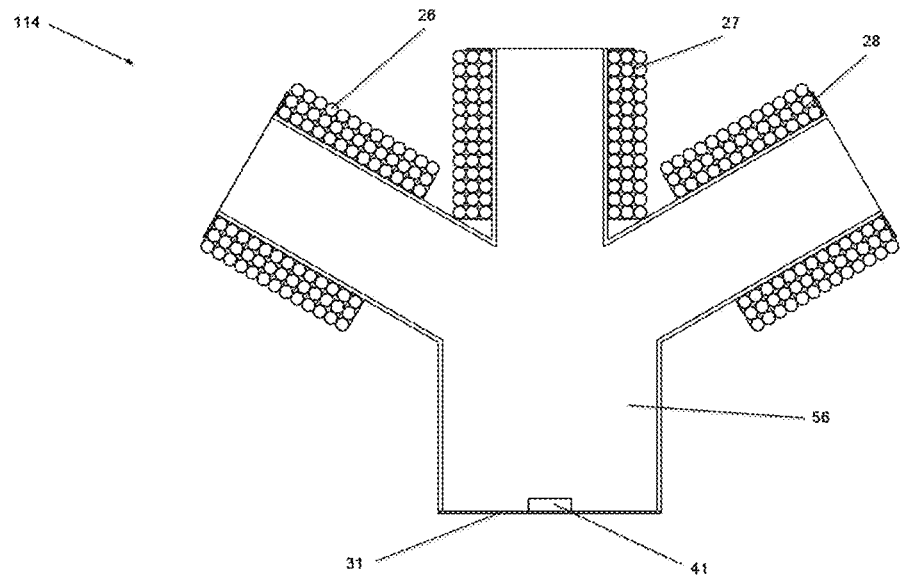
FIG. 15 is a front cross-sectional view of the present invention showing a plurality of solenoids.

In another embodiment as shown in FIG. 15, the gripping device 114 has three solenoid 26-28. A chamber 56 is constructed to have the solenoids 26-28 wrapped around its branches. For instance, solenoids 26-28 can be used to better control the movement direction of the plunger 41. Depending on design requirements, solenoids 26-28 can be completely different from each other. They can also be connected to a controller individually or connected together in series or parallel. While FIG. 15 includes three solenoids, the number could be higher or lower and their position can be arranged differently depending on the application.

Figure 16:
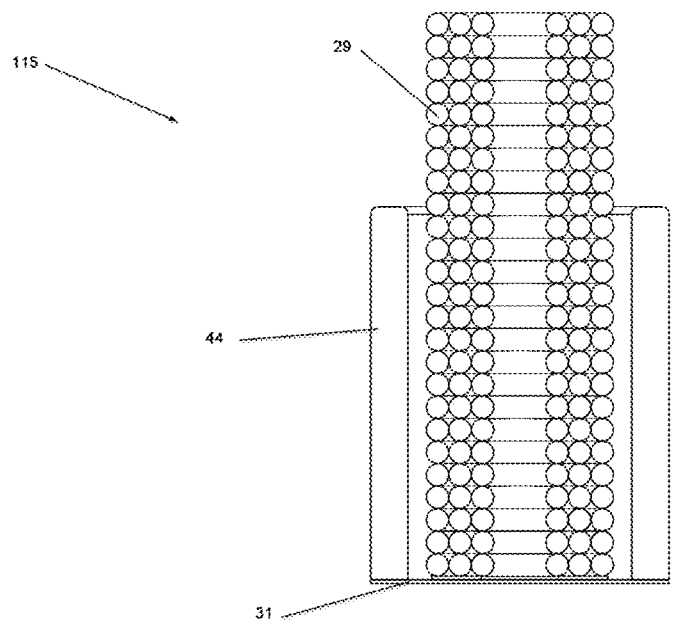
FIG. 16 is a front cross-sectional view of the present invention showing a solenoid in a different configuration.

In another embodiment as shown in FIG. 16, the gripping device 115 is shown which has a plunger 44 around a solenoid 29. In this embodiment the magnetic field around outside the solenoid 29 interacts with the plunger 44 to induce the membrane 31 to provide the gripping or attractive force.

In another embodiment as shown in FIG. 17, the gripping device 116 is shown gripping an object 91. In this embodiment, the solenoid 23 has pulled the plunger 41 further higher than the object 91. As a result, a suction is created between the membrane 31 and the object 91. Therefore, not only the surface texture and friction between the membrane 31 and the object 91 is gripping the object 91, but also the suction pocket created between the object 91 and the membrane 31 increases the griping force. The object 91 does not need to be necessary around the object, but it can be of different shapes. For instance, if the object 91 is flat, then the suction created has a big impact in the gripping strength. The suction in this embodiment is caused by the ratio between the initial volume and the final volume of the pocket between the object 91 and the membrane 31. The initial volume is considered to be the volume when the membrane 31 is just touching the object 91. Such an initial volume can be nil. The final volume is the volume of the suction pocket shown in FIG. 17.

In more detail, and still referring to FIG. 17, the suction strength can also be increased or decreased by changing design attributes. For instance, the solenoid 21 magnetization field can be decrease or increase to position the plunger 41 lower or higher respectively and hence decrease or increase the suction pocket created. In another instance, the membrane 33 can have variable thickness as shown in FIG. 9. One example is to increase the thickness of the membrane 33 in the part where the suction pocket is located. This extra thickness can cause the membrane 33 to stretch less in this part, and consequently will change the volume ratio creating the suction pocket. Therefore, the membrane 33 can have variable thickness, shaped as a truncated cone, flat circle, combination of them all, or any other shape. In other words, different shapes of the membrane 33 can have an effect on increasing and decreasing the suction pocket created.

The advantages of the present invention include, without limitation, its simplicity, speed, versatility, size, and the ability to pick large variety of objects, including delicate objects, objects having different shapes and made of different materials and surface finish. It is a fast action gripper since its main actuation is based on a solenoid 21. This invention can also use a suction force to grip an object without the need for a separate vacuum line. The design also minimizes the amount of mechanical wear. Further the device can easily mount on an industrial robot and move in tight spaces.

Figure 23:
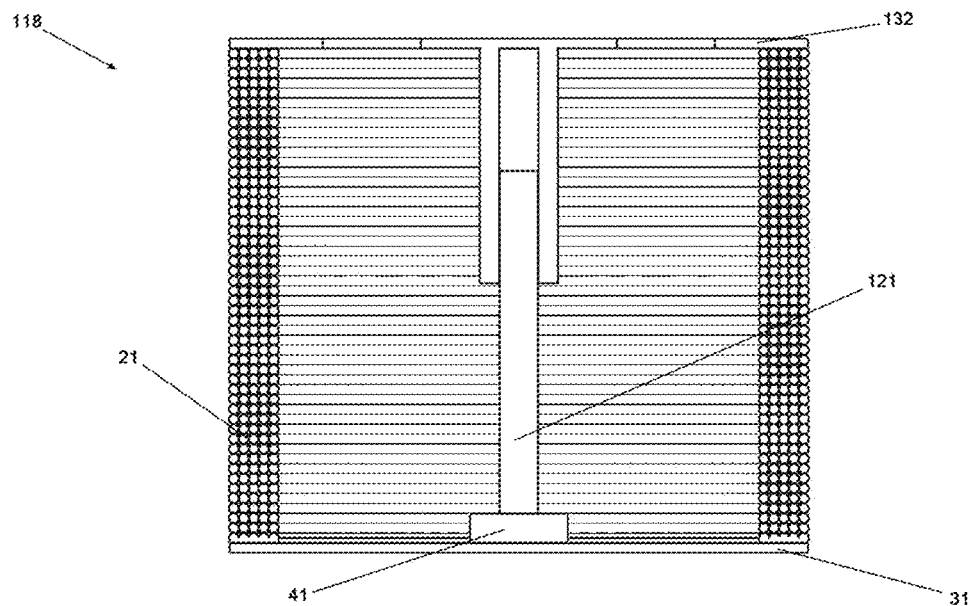
FIG. 23 is a cross-sectional view of the present invention using a rod to guide the plunger.

In another embodiment as shown in FIG. 23, another version of the gripping device 117 is shown. The gripper 117 has a rod 121 attached to the plunger 41 fixed to the membrane 31. The plunger 41 and the rod 121 can be one single element. The plunger 41 and the rod 121 could have different shapes and orientations. The gripper 117 could have a cover 131. The cover 131 could have a shape to limit the movement of the rod 121. For example, the cover 131 could have a groove to guide the rod 121 in the center of solenoid 21 axis. The cover 131 could be made of a single or multiple parts and materials. The cover 131 could be part of a chamber that seals the membrane 31 such that a gas or fluid could be contained within the chamber and a membrane 31.

Figure 24:
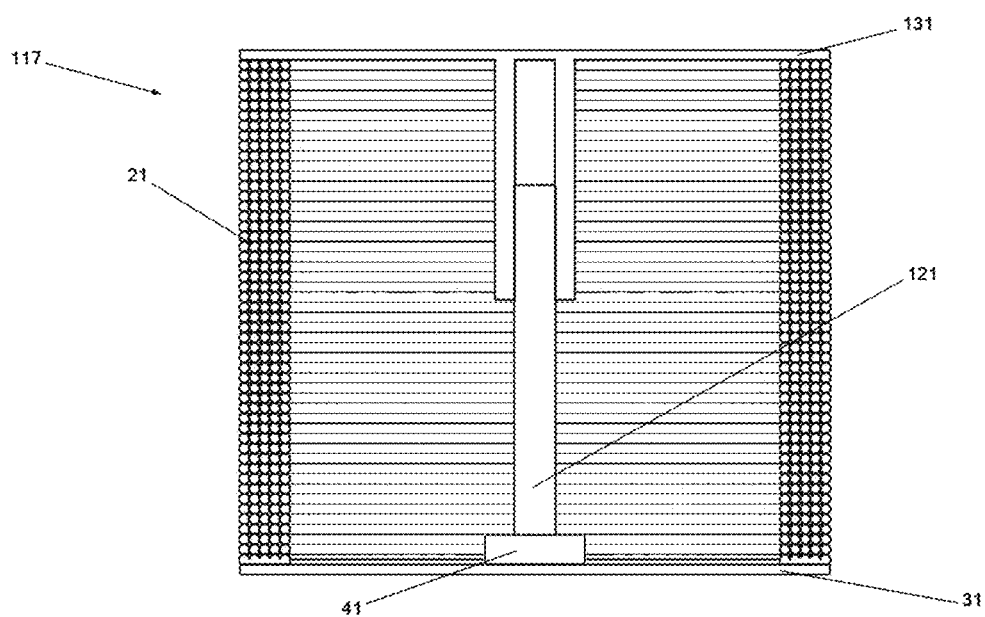
FIG. 24 is a cross-sectional view of the present invention having an open end and using a rod to guide the plunger.

In another embodiment as shown in FIG. 24, gripper 118 is shown, where the cover 132 has holes to expose the air inside coil 21 to surrounding pressure. Holes could have different shape or could be substituted by a porous material.

Figure 25:
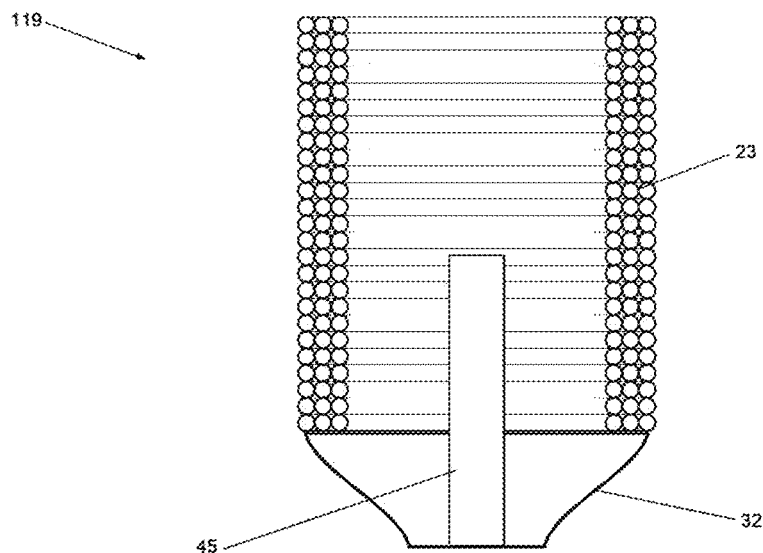
FIG. 25 is a cross-sectional view of the present invention showing a large plunger attached to a loose membrane.
Figure 26:
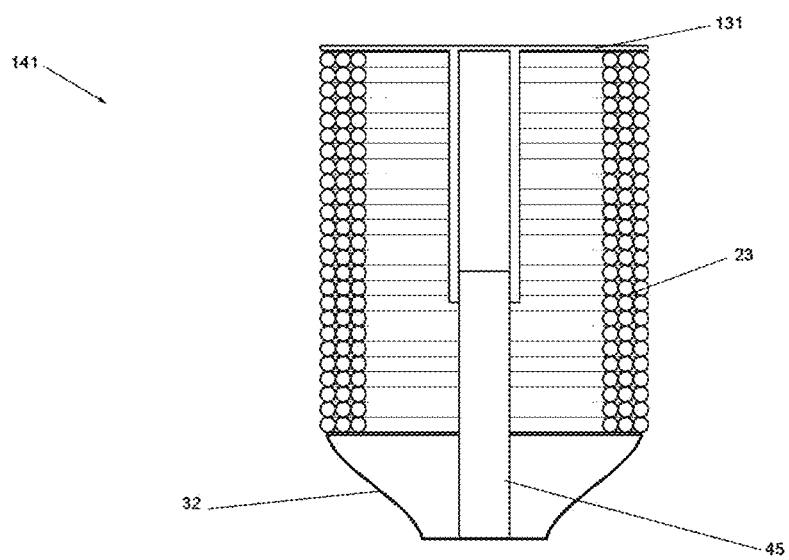
FIG. 26 is a cross-sectional view of the present invention showing a large plunger attached to a loose membrane with a guide groove.

In another embodiment as shown in FIG. 25, gripper 119 is shown. The plunger 45 can be in different size and shapes. For instance, the plunger 45 shown in FIG. 25, has an elongated shape. It should be noted that the membrane 32 can be loose as shown in FIG. 25. Such a loose membrane 32 could farther facilitate the membrane itself to conform to the object's shape. As shown in FIG. 26, the gripper 141 can have a cover 131. The plunger 45 can move within the groove limits of the cover 131.

Figure 27:
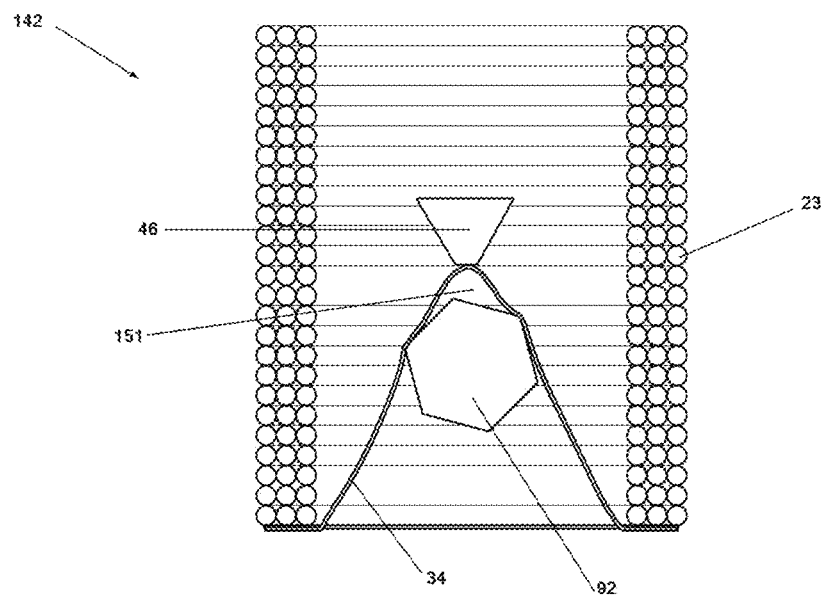
FIG. 27 is a cross-sectional view of the present invention gripping a random shape object showing the suction created between the object and the membrane and the formation of the membrane around the object.

In another embodiment as shown in FIG. 27, the gripper 142 is shown gripping an object 92. Object 92 can be of any shape and orientation. As shown in FIG. 27, the membrane 34 is formed around the object 92 and also a suction cavity 151 is formed between the object 92 and the membrane 34. Formation of the membrane 34 around the object 92 and the suction cavity 151 helps with gripping the object 92. As previously mentioned, the plunger 41 could have different shapes. FIG. 27 shows an example of a plunger 46 which has a conical shape.

In a broad embodiment, the present invention consists of at least a solenoid 21, at least a plunger 41, and at least a membrane 31. The interaction among the solenoid 21, the plunger 41, and the membrane 31 induces the membrane 31 to provide a gripping or attractive force.

In a broad embodiment, the present invention consists of a method of grasping objects 91 using at least a solenoid 21, at least a plunger 41, and at least a membrane 31.

While the above description contains specific details regarding certain elements, sizes, and other teachings, it is understood that embodiments of the invention or any combination of them may be practiced without these specific details. Specifically, although certain materials and shapes are designated in the above embodiments, any suitable materials or shapes may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An electromagnetic gripping device, comprising:
a solenoid comprising a conductive material, wherein said solenoid generates an electromagnetic field when current is applied;
a deformable membrane; and
a plunger attached to said deformable membrane and positioned within said electromagnetic field, said plunger further comprising a ferromagnetic, ferrimagnetic, or magnetic material configured to interact with said electromagnetic field;
a chamber, wherein said deformable membrane is positioned adjacent to said chamber, said chamber configured to provide structural support to the device;
at least one sensor positioned within said chamber, said sensor configured to detect the pressure inside said chamber, the volume inside said chamber, the temperature of said solenoid or the position of said plunger;
wherein said plunger will move according to changes within said electromagnetic field, and wherein moving said plunger also moves said deformable membrane, providing a gripping or attractive force when said deformable membrane is positioned adjacent to an object;
wherein said plunger further comprises a plurality of plungers, and wherein said plurality of plungers are stacked.

2. The device of claim 1, wherein changes to said current applied to said solenoid change the force and direction of said electromagnetic field, and wherein said changes manipulate the movement and position of said plunger within said electromagnetic field.

3. The device of claim 1, wherein said membrane comprises ferromagnetic, ferrimagnetic, or magnetic material configured to interact with said electromagnetic field independently of said plunger.

4. The device of claim 1, wherein the membrane further comprises a variable thickness and wherein the membrane further comprises a plurality of different materials.

5. The device of claim 1, further comprising an adapter positioned adjacent to said solenoid, wherein said membrane is attached to said adapter, and wherein said adapter is configured to modify the deformation of said membrane to maximize the grasping or attractive forces provided by said membrane.

6. The device of claim 1, further comprising a cooling system positioned adjacent to said solenoid and configured to reduce the temperature of said solenoid.

7. The device of claim 1, wherein said solenoid further comprises a hollow tube wherein coolant may flow through said hollow tube, reducing the temperature of said solenoid.

8. The device of claim 1, further comprising a guide positioned within said solenoid, said guide further comprising an aperture configured to receive said plunger, and wherein said plunger is configured to maintain its direction of movement while interacting with said guide.

9. The device of claim 1, wherein said membrane further comprises a micro-featured surface adapted to provide dry adhesion.

10. The device of claim 1, wherein said membrane further comprises at least one conductive material adapted to provide electrostatic adhesion, wherein a voltage is applied to said at least one conductive material providing an attractive force to self-preload said membrane, a resistive force to self-peel said membrane, or alternating said voltage to self-clean said membrane.

11. An electromagnetic gripping device, comprising:
a chamber;
a solenoid configured to generate an electromagnetic field;
a deformable membrane positioned adjacent to said chamber; and
a plunger attached to said deformable membrane and positioned within said electromagnetic field, said plunger configured to interact with said electromagnetic field;

a chamber, wherein said deformable membrane is positioned adjacent to said chamber, said chamber configured to provide structural support to the device;

at least one sensor positioned within said chamber, said sensor configured to detect the pressure inside said chamber, the volume inside said chamber, the temperature of said solenoid or the position of said plunger;

wherein the deformation of said deformable membrane is maintained through the controlled position of said plunger through the manipulation of said electromagnetic field, providing a suction force to an object;

wherein said plunger further comprises a plurality of plungers, and wherein said plurality of plungers are stacked.

12. A method of electromagnetically gripping an object, using an electromagnetic gripping device having a chamber, a plunger, a deformable member and a sensor, the method comprising:

positioning a deformable membrane adjacent to an object, said deformable membrane further comprising a plunger configured to interact with an electromagnetic field; and generating said electromagnetic field through a solenoid positioned adjacent to and outside of said deformable membrane and plunger; and manipulating said electromagnetic field through changes in current; and recording measurements of the sensor;

wherein the deformation of said deformable membrane is maintained through the controlled position of said plunger through the manipulation of said electromagnetic field, and wherein said deforming will grip or apply attractive forces to said object;

wherein said deformable membrane is positioned adjacent to a chamber, said chamber configured to provide structural support to the device;

wherein said sensor is configured to detect the pressure inside said chamber, the volume inside said chamber, the temperature of said solenoid or the position of said plunger;

wherein said plunger further comprises a plurality of plungers, and wherein said plurality of plungers are stacked.

13. The method of claim 12, wherein said membrane comprises ferromagnetic, ferrimagnetic, or magnetic material configured to interact with said electromagnetic field independently of said plunger.

14. The method of claim 12, further comprising an adapter positioned adjacent to said solenoid, wherein said membrane is attached to said adapter, and wherein said adapter is configured to modify the deformation of said membrane to maximize the grasping or attractive forces provided by said membrane.

15. An electromagnetic gripping device, comprising:

a solenoid comprising a conductive material, wherein said solenoid generates an electromagnetic field when current is applied;

a deformable membrane; and a plunger attached to said deformable membrane and positioned within said electromagnetic field, said plunger further comprising a ferromagnetic, ferrimagnetic, or magnetic material configured to interact with said electromagnetic field;

wherein said plunger further comprises a plurality of plungers that are stacked;

wherein said plunger will move according to changes within said electromagnetic field, and wherein moving said plunger also moves said deformable membrane, providing a gripping or attractive force when said deformable membrane is positioned adjacent to an object.

16. The device of claim 15, further comprising a chamber, wherein said deformable membrane is positioned adjacent to said chamber, said chamber configured to provide structural support to the device; and a plurality of sensors positioned within said chamber, said sensors configured to detect the pressure inside said chamber, the volume inside said chamber, the temperature of said solenoid or the position of said plunger.

17. The device of claim 15, wherein changes to said current applied to said solenoid change the force and direction of said electromagnetic field, and wherein said changes manipulate the movement and position of said plunger within said electromagnetic field.

18. The device of claim 15, wherein said membrane comprises ferromagnetic, ferrimagnetic, or magnetic material configured to interact with said electromagnetic field independently of said plunger.

19. The device of claim 15, further comprising an adapter positioned adjacent to said solenoid, wherein said membrane is attached to said adapter, and wherein said adapter is configured to modify the deformation of said membrane to maximize the grasping or attractive forces provided by said membrane.

* * * * *